3,465,084
TREATMENT OF VIRUS DISEASES WITH A HALOGENATED NITROPHENOL
William F. Jackson, 4006 S. Florida Ave., Lakeland, Fla. 33803
No Drawing. Continuation-in-part of application Ser. No. 607,162, Jan. 4, 1967. This application May 6, 1968, Ser. No. 727,041
Int. Cl. A61k *27/00;* A01n *9/26*
U.S. Cl. 424—347
9 Claims

ABSTRACT OF THE DISCLOSURE

The treatment of virus diseases involving a predominance of deoxyribonucleic acid in animals by the injection of halogenated nitrophenols.

---

This application is a continuation-in-part of application Ser. No. 607,162 filed Jan. 4, 1967, now abandoned.

This invention relates to the treatment of virus diseases involving a predominance of deoxyribonucleic acid (DNA). More particularly, this invention relates to the use of halogenated nitrophenols for virus diseases to depress the replication of DNA in living cells.

Diseases in which DNA predominates frequently show up as warts. In such, there appears to be a depression of the normal oxidative function that occurs in living cells.

On the other hand, nitrophenols are known to increase the oxidative metabolism of cells by blocking phosphorylation in the tissues. This causes metabolic stimulation. Hence, there is an increased oxygen demand producing an increase in cell temperature.

In the past, the medical and veterinary professions have been extremely cautious about use of nitrophenols because of this phenomena. The Manual of Pharmacology, 6th edition, by Sollman, p. 585 et seq., (1944), specifically warns against their use on the basis that these compounds frequently cause side reactions, such as skin eruptions and neuritis, cataracts, neutrophenia and liver and kidney damage.

A link-up between the above two observations has never occurred. In fact, but for two very recent developments, nitrophenols have been generally discarded as drugs.

The two recent developments for use of nitrophenols have been patented. U.S. 3,081,224 teaches that certain nitrophenols are good for removing helminths (hookworms) from domestic animals. U.S. 3,265,569 teaches their use for treating Demodex Canis (mange). But these teachings are specific to one use.

Accordingly, an object of this invention is to provide still another new use for a specific group of nitrophenols.

Another object is to provide a treatment of virus diseases in which there is a predominance of DNA.

A further object is to provide a treatment of the above character which is safe, notwithstanding the renowned toxicity of the nitrophenols used.

A still further object is to provide a single treatment of the above character which is relatively long lasting and economical.

Other objects of the invention will in part be obvious and will in part appear hereinafter.

It has now been found that mono- and di-halogenated nitrophenols are effective in retarding and even removing objectionable viral tissue growths. More particularly, it has been found that the administration, via subcutaneous or submucous or intramuscular injection (and intravenously by drip infusion of the lower concentration treatment range), of about 4 to 20 milligrams per kilogram of body weight, and subconjunctival injection, and topically using a 0.1 to 1.0% solution of 2-chloro-4-nitrophenol,
2-bromo-4-nitrophenol,
2-iodo-4-nitrophenol,
2-fluoro-4-nitrophenol,
2,6-dichloro-4-nitrophenol,
2,6-dibromo-4-nitrophenol,
2,6-diiodo-4-nitrophenol,
2,6-difluoro-4-nitrophenol or mixtures thereof, results in arresting, diminishing and even occasionally completely removing certain undesired tissue growth or virus replication. Such undesired tissue growth may comprise oral papillatoma, caused by the rapid growth apparently due to replication of DNA or increased intracellular metabolism can also be controlled and even diminished. These diseases appear to be caused by infection due to Herpes virus such as feline rhinotracheitis and infectious bovine rhinotracheitis; pox virus, such as fowl pox; papovavirus, such as canine wart virus; and adenovirus, such as infectious canine hepatitis. The halogenated phenols are particularly effective during the early stages of the above virus infections because of their unique ability to inhibit replication of DNA.

The invention accordingly comprises the several steps and the relation of one or more of such steps with respect to each of the others, which are exemplified in the following detailed disclosure, and the scope of the invention will be indicated in the claims.

Reference is now made to specific examples which illustrate the invention in greater detail.

Example I

A 14-pound mongrel dog having warts in its mouth is injected subcutaneously and submucousally below said warts with 1.4 cc. of 2,6-diiodo-4-nitrophenol. Two days thereafter, the warts were swollen and apparently quite sore. However, one week later, the warts were no longer present and no noticeable lesions were seen where the warts formerly had been.

Example II

A 60-pound Great Dane with several oral papillatoma of one centimeter diameter in its mouth and on its lips was injected subcutaneously and below said papillatoma with a total of 240 milligrams of 2,6-diiodo-4-nitrophenol. In two weeks, the papillatoma completely disappeared.

Example III

A 20-pound Collie crossed female dog with about forty papillatoma in its mouth was given a total of 100 milligrams of 2,6-diiodo-4-nitrophenol via subcutaneous injection. Five days later, all the warts were gone.

Example IV

A 45-pound female Labrador with four small (0.3 cm.) papillatoma on the mucosa of the upper lip was subcutaneously injected with a total of 200 milligrams of 2,6-diiodo-4-nitrophenol. Upon examination, eight days later, there was no change in the size of the papillatoma. A second dose in the same manner and in the same amount was administered. In two weeks, there was no evidence of lesions being present where the warts had been.

Examples V and VI

Three cats infected with feline rhinotracheitis were given 4 milligrams per pound of body weight intramuscularly of bromonitrophenol. The course of disease was shortened compared with alternate cases not treated with the same nitrophenol.

Four cats similarly infected with feline rhinotracheitis were treated with a similar amount of an equal part mixture of 2,6-dichloro-4-nitrophenol and 2,6-dibromo-4- nitrophenol. In each case, the course of the disease was shortened.

It should be evident from the above examples that halogenated nitrophenols are effective in regulating virus diseases which involve a predominance of deoxyribonucleic acid. The best results observed have been with 2,6-diiodo-4-nitrophenol, and therefore, this compound is preferred. Also, it was observed that with virus infections, the earlier the treatment, the better. This is logical since the main effect of the remedial compounds is to inhibit replication of DNA.

It will thus be seen that the objects set forth above, among those made apparent from the preceding description, are efficiently attained, and since certain changes may be made in carrying out the above method without departing from the scope of the invention, it is intended that all matter contained in the above description shall be interpreted as illustrative and not in a limiting sense.

What is claimed is:

1. A method for the treatment of virus diseases selected from the group consisting of feline rhinotracheitis, infectious bovine rhinotracheitis, pox virus, papovavirus, and adenovirus, comprising administering to an animal suffering from said virus diseases an antiviral effective quantity of a halogenated nitrophenol selected from the group consisting of 2-chloro-4-nitrophenol,
2-bromo-4-nitrophenol,
2-iodo-4-nitrophenol,
2-fluoro-4-nitrophenol,
2,6-dichloro-4-nitrophenol,
2,6-dibromo-4-nitrophenol,
2,6-diiodo-4-nitrophenol,
2,6-difluoro-4-nitrophenol and mixtures thereof.

2. The method of claim 1 wherein said halogenated nitrophenol comprises 2,6-diiodo-4-nitrophenol.

3. The method of claim 1 wherein said halogenated nitrophenol is administered subcutaneously at a concentration of 4 to 20 milligrams per kilogram of body weight.

4. The method of claim 1 wherein said halogenated nitrophenol is administered submucously at a concentration of 4 to 20 milligrams per kilogram of body weight.

5. The method of claim 1 wherein said halogenated nitrophenol is administered intramuscularly at a concentration of 4 to 20 milligrams per kilogram of body weight.

6. The method of claim 1 wherein said halogenated nitrophenol is administered topically at a concentration of 0.1 to 1.0% in solution.

7. The method of claim 1 wherein said halogenated nitrophenol is administered for eye infection by subconjunctival injection using a concentration of 0.1 to 1.0% in solution.

8. The method of claim 1 wherein said halogenated nitrophenol is administered intravenously by drip infusion at a concentration of 4 to 20 milligrams per kilogram of body weight.

9. The method of claim 1 wherein said virus disease comprises feline rhinotracheitis.

References Cited

UNITED STATES PATENTS

| | | | |
|---|---|---|---|
| 3,081,224 | 3/1963 | Thorson et al. | 424—347 |
| 3,265,569 | 8/1966 | Jackson | 424—347 |

ALBERT T. MEYERS, Primary Examiner

JEROME D. GOLDBERG, Assistant Examiner